United States Patent [19]
Fineman et al.

[11] 3,938,378
[45] Feb. 17, 1976

[54] ENGINE COMPRESSION TESTING

[75] Inventors: Howard E. Fineman, Newton Centre; Steven M. Schlosser, Peabody; Lawrence M. Hill, Acton; Richard E. Hanson, Winchester, all of Mass.

[73] Assignee: The United States of America as represented by the Secretary of the Army, Washington, D.C.

[22] Filed: Aug. 26, 1974

[21] Appl. No.: 500,418

[52] U.S. Cl. ............................................. 73/117.2
[51] Int. Cl.² ....................................... G01M 15/00
[58] Field of Search ................. 73/116, 117.2, 115

[56] References Cited
UNITED STATES PATENTS 3,765,233  10/1973  Germann ......................... 73/117.2
3,823,606  2/1973  Maringer ............................ 73/115
3,839,906  10/1974  Hanson ................................ 73/115

Primary Examiner—Jerry W. Myracle
Attorney, Agent, or Firm—John E. McRae; Peter A. Taucher; Robert P. Gibson

[57] ABSTRACT

A method of testing compression capabilities of multi-cylinder engines which are cranked with electrically-energized starter motors. The cylinders are prevented from firing, and the engine is cranked by the starter motor. During the cranking period measurements are taken of the starter motor current. A comparison of the peak current and average current provides an indication of the compression capability of the engine.

1 Claim, 3 Drawing Figures

ENGINE COMPRESSION TESTING

BACKGROUND OF THE INVENTION

At the present time, conventional compression tests on reciprocating internal combustion engines require connecting a pressure gauge (with an internal check valve) to each cylinder in succession. The engine is then cranked with the starter motor while inhibiting combustion. This process is repeated for each cylinder, and the peak pressures measured on the guage are compared against test limits by the mechanic. If either an excessive difference in compression exists between any two cylinders, or the average compression is below a specified value, one or more engine faults are indicated. These faults might include such things as worn piston rings or cylinders; cracked pistons or cylinder block; misadjusted, worn, or cracked valves; or a defective cylinder head or cylinder head gasket. The compression test is very useful therefore in detecting this class of basic engine faults. However, the time required and inconvenience of performing the test, combined with the need to remove all of the spark plugs or fuel injectors on most engines, results in the mechanic's reluctance to perform the test routinely unless specific performance complaints or fault symptoms have been indicated. Furthermore, if automatic test equipment is to be used for fault detection and isolation, the additional pressure transducers required for practical implementation would be costly and just as inconvenient as the conventional test, if not more so.

THE INVENTION

To circumvent the above problems, a technique has been developed which detects compression faults by measurement and evaluation of the starter motor current during engine cranking. Compression evaluation is accomplished by examining the dynamic starter current and comparing the instantaneous peak current with the average current.

RELATED PATENTS AND APPLICATIONS

This invention is related in a general sense to the inventions shown in U.S. Pat. No. 3,765,233 issued on Oct. 16, 1973 to R. Germann, and U.S. Pat. application, Ser. No. 404,802 filed on Oct. 9, 1973 in the name of R. E. Hanson.

THE DRAWINGS

Figure 1:
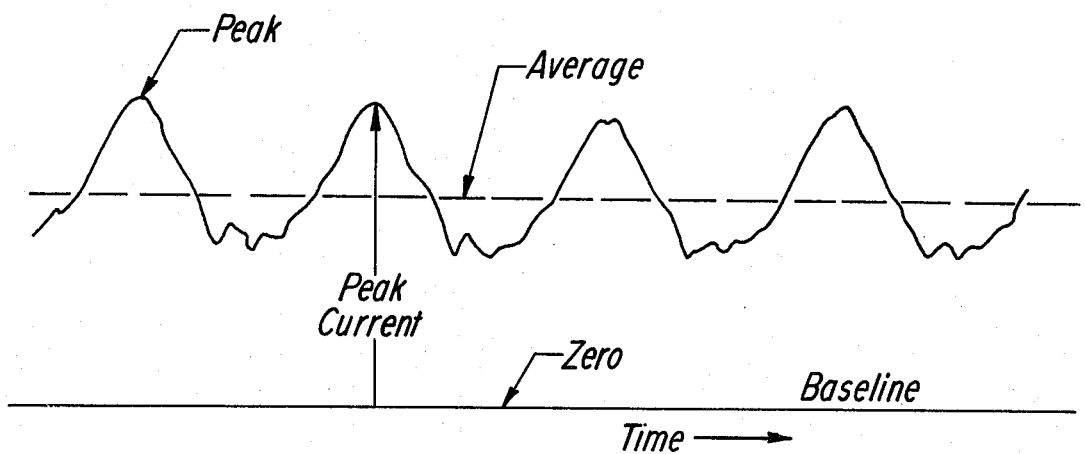
FIG. 1 shows a starter current waveform for an acceptable engine.
Figure 2:
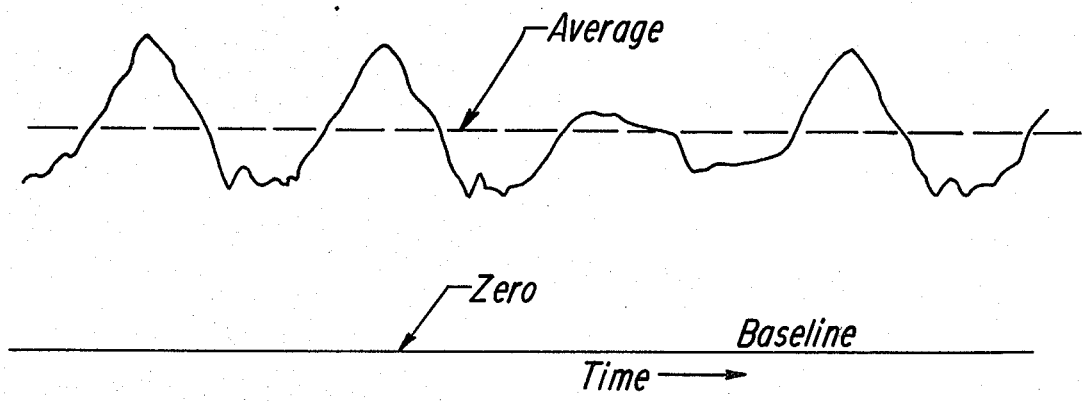
FIG. 2 shows a starter current waveform for an engine having one low compression cylinder.

FIG. 1 shows a typical starter current waveform for an acceptable engine. The compression information is contained in the steady-state portion of the waveform after decay of the initial transient. The positive portion of the AC component corresponds to starter torque required to compress the air or air/fuel mixture in the cylinders on the compression stroke. A uniform compression loss in all cylinders reduces the total AC component of the waveform, while a compression loss in an individual cylinder will reduce the peak current related to the compression stroke for the particular cylinder. FIG. 2 shows the effect of inserting a compression fault in a single cylinder.

The advantage of comparing the peak current with the average current is that compensation is inherently provided for any variations in the DC component of the waveform. This includes variations in constant friction torque due to oil viscosity, clearance, or wear. This compensation would have to be explicitly provided by some other means if absolute rather than relative values of peaks are measured.

If the time of occurrence of the peak current is known, it is possible to compare the instantaneous peak current with the average current. If the peak is too low with respect to the average, a compression fault is indicated. Comparison is accomplished by attenuating the instantaneous peak by an amount corresponding to the desired limit for the allowable reduction in the peak value. The attenuated peak is then compared to the average by means of a comparator 22; if the attenuated peak is less than the average, a compression fault is indicated. For example, in one experimental arrangement the limit was set at 90% of normal peak value.

The following prerequisites must be satisfied before a valid compression test can be run:

1. the engine must be up to operating temperature;
2. combustion must be inhibited during the test;
3. sensing of the peak current must coincide with the occurrence of the true peak, and
4. measurements must be delayed until the starter motor current reaches its steady state value, i.e., until after the initial starter transients have decayed.

Figure 3:
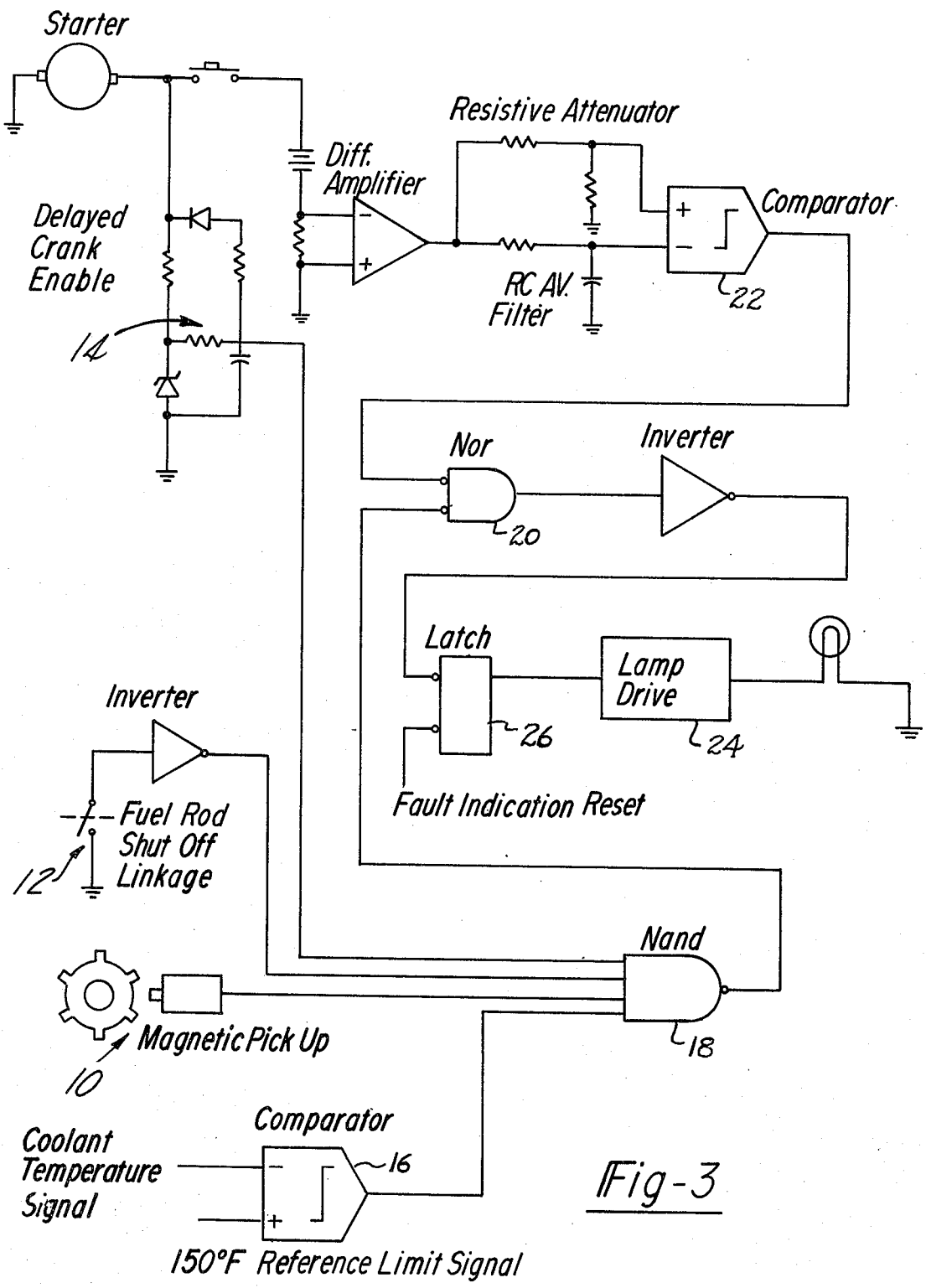
FIG. 3 is a circuit diagram for a tester incorporating the invention.

Information on when the peak current occurs may be provided by a pulse generating transducer connected to a tachometer drive shaft on the engine. The transducer is comprised of a magnetic pickup and a multi-lobed rotor, one lobe for each cylinder. As the tooth of the rotor passes the pickup a pulse is generated. FIG. 3 schematically illustrates a pulse-tachometer transducer at 10. The transducer is installed in series with the normal tachometer drive; it can be added to the vehicle without requiring any engine modification. The rotor and housing of the pulse-tachometer transducer are mechanically phased to the tachometer drive shaft so that the output pulse coincides with the peak of the dynamic starter current waveform. By interlocking the transducer output pulse with the comparator circuit, the evaluation of starter current peaks is inhibited whenever a peak does not normally occur. This prevents a false fault indication which would be caused by evaluating the wrong portion of the waveform.

As noted, another requirement for application of this compression test technique is that combustion be prevented during the cranking evaluation. If a cylinder fires, the crankshaft receives a torque contribution from a source besides the starter motor. This causes a reduction in the current requirement from the motor that would be interpreted as a compression loss. On compression ignition engines the "combustion inhibit" function is accomplished by interlocking the fuel shutoff rod or solenoid. This requires the mechanic to prevent combustion by pulling out the Engine Stop lever. A limit switch 12 is added to the shutoff linkage, which prevents a compression fault indication unless the rod is fully extended. On spark ignition engines the same function would be provided by cranking with the ignition switch in the OFF position.

To further assure that comparisons are only made during valid portions of the starter motor operation, a signal called "delayed crank enable" is generated from the starter switch; suitable circuitry is indicated at 14 in FIG. 3. This signal enables the compression test circuit only after the initial starter transient has decayed.

As previously noted, the compression test is performed with the engine at normal running temperatures. Although compensation for a reasonable variation in the engine temperature is provided by comparison of the peak current with a "floating" average current, an interlock 16 can be provided to insure that the engine is warmed prior to the test. On one experimental arrangement this interlock function was triggered by the engine coolant temperature reaching 150°F. However, since coolant temperature typically leads the rise in oil temperature (which is more of an indication of a normal engine operating condition) it is preferable to use oil temperature rather than coolant temperature as an interlock.

A functional block diagram of a compression fault circuit incorporating the above interlocks is shown in FIG. 3. As shown in the figure, the comparison of peak with average starter current is continuously made by comparator 22 during cranking. However, the comparison is combined with the other interlock inputs, and a fault indication is only validated when the other inputs are in the conditions described above. Once a compression fault has been indicated, it is stored in the compression fault latch for display to the mechanic by means of a lamp driver from the latch output.

The FIG. 3 circuit includes a NAND gate 18 located to receive the four "test prerequisite" signals generated at 10, 12, 14, and 16. A NAND gate consists of an AND gate followed by an inverter. In the operation of an AND gate, if all input signals are "1" logic, the AND output will be logic "1"; this is inverted to provide a NAND output logic of "0". Thus, if any of the four input signals of NAND gate 18 are "0" logic the NAND output will be a "1" logic.

The output of the NAND gate is applied to a NOR gate 20; the output from comparator 22 is also applied to the NOR gate. A NOR gate consists of an OR gate followed by an inverter. The characteristics of an OR gate is that if either or both input signals are "1" logic the output signal will be a "1". The OR output "1" logic signal is inverted to provide a "0" logic NOR output.

The illustrated circuitry is designed so that when the four test prerequisites (10, 12, 14 and 16) are satisfied the NAND gate 18 will transmit a logic "0" signal to the NOR gate. If at that instant the comparator 22 is delivering a "0" logic signal (indicating peak below limit) to the NOR gate then the NOR gate will transmit a fault signal to the appropriate indicator mechanism (latch 26 and lamp drive 24). If any of the four input signals to NAND gate 18 are "0" logic (i.e. other than "1" logic) the NOR gate will be unable to transmit a fault signal to the indicator mechanism.

We wish it to be understood that we do not desire to be limited to the exact details of construction shown and described, for obvious modifications will occur to a person skilled in the art.

We claim:

1. A method of testing compression capabilities of multi-cylinder engines: said method comprising the step of cranking the engine with an electrically-energized starter motor; providing a first analog signal representative of instantaneous peak starter motor current; providing a second analog signal representative of average starter motor current; applying the first and second signals to a comparator; providing a NAND gate; applying to the NAND gate a third signal representative of engine operating temperature; applying to the NAND gate a fourth signal representing combustion inhibition; applying to the NAND gate a fifth signal representative of piston position in the engine cylinder; applying to the NAND gate a sixth signal representing the attainment of steady state starter motor operation; applying the outputs of the comparator and NAND gate to a NOR gate; and applying the output of the NOR gate to an indicator mechanism.

* * * * *